(12) United States Patent
Dobashi et al.

(10) Patent No.: US 8,289,403 B2
(45) Date of Patent: Oct. 16, 2012

(54) IMAGE PROCESSING SYSTEM

(75) Inventors: Toshimasa Dobashi, Kanagawa-ken (JP); Hiroyuki Mizutani, Kanagawa-ken (JP); Naoaki Kodaira, Tokyo (JP); Tomohisa Suzuki, Kanagawa-ken (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 410 days.

(21) Appl. No.: 12/723,000

(22) Filed: Mar. 12, 2010

(65) Prior Publication Data
US 2010/0231733 A1    Sep. 16, 2010

(30) Foreign Application Priority Data
Mar. 13, 2009  (JP) ................ P2009-062044

(51) Int. Cl.
*H04N 5/228* (2006.01)
(52) U.S. Cl. .............. 348/208.4; 348/208.5; 348/208.6; 348/220.1
(58) Field of Classification Search .... 348/208.1–208.7, 348/154, 155; 382/107
See application file for complete search history.

(56) References Cited

U.S. PATENT DOCUMENTS

| | | | |
|---|---|---|---|
| 5,012,270 A * | 4/1991 | Sekine et al. | 396/54 |
| 5,614,945 A * | 3/1997 | Sekine et al. | 348/207.99 |
| 5,748,231 A * | 5/1998 | Park et al. | 348/207.99 |
| 2009/0268079 A1* | 10/2009 | Motomura et al. | 348/347 |

FOREIGN PATENT DOCUMENTS
JP    2006-157934    6/2006
* cited by examiner

*Primary Examiner* — Yogesh Aggarwal
(74) *Attorney, Agent, or Firm* — Finnegan, Henderson, Farabow, Garrett & Dunner, L.L.P.

(57) ABSTRACT

A recognition object detecting portion detects a recognition object existing in each of images which are captured in series at different time points by a camera. Images of the detected recognition object are stored in a memory. A recognition object condition judging portion determines whether image areas of the recognition object are recognizable. A movement amount detecting portion detects a movement amount of the recognition object by using the image areas of the recognition object stored in the memory. A sub-area detecting portion detects a sub-area to be recognized, by using the image areas of the recognition object read out from the memory, in accordance with the movement amount of the recognition object. A recognition portion performs recognition processing on the sub-areas. A recognition result integration portion integrates recognition results of the sub-areas including recognized characters and/or recognized patterns and the corresponding reliabilities, respectively.

7 Claims, 7 Drawing Sheets

IMAGE PROCESSING SYSTEM

CROSS REFERENCE TO RELATED APPLICATION

This application is based upon and claims the benefit of priority from the prior Japanese Patent Application No. 2009-62044, filed on Mar. 13, 2009, the entire contents of which are incorporated herein by reference.

FIELD OF THE INVENTION

The present invention relates to an image processing system configured to process images captured by a camera.

DESCRIPTION OF THE RELATED ART

Description of the Background

Recently, a high-resolution camera has been built-in in an information device such as mobile terminals or personal computers (hereinafter, represented as "PCs"). Various recognition processes are capable of being performed in mobile terminals or PCs by using a built-in camera. The recognition processes may be recognition of a human face, recognition of code patterns represented by barcodes and QR codes, recognition of characters displayed on a business card, or the like.

When an image captured by the camera is subjected to recognition processing in an information device such as a mobile terminal or a PC, either a camera or a recognition object is held by hands in many cases.

Thus, a camera-shake image or defocused and blurred image may be inputted into the information device due to hand movement. As a result, the information device may exhibit a poor recognition performance.

In order to eliminate such a problem, a system, which can detect a focused state of images inputted sequentially from a camera and which can display the focused state to the user, is disclosed in Japanese Patent Application Publication No. 2006-157934.

Furthermore, a system, which can capture still image automatically when the target object is in focus, has also been put into practical use.

In these systems, it is required to capture a recognition object so that it can be as large as possible in the center of an image capturing range, in order to recognize an image.

However, the recognition object does not always come in center. Particularly, when an image area in a peripheral portion, which is far from the center of the image capturing area, is recognized, a low recognition performance is caused for the image area.

SUMMARY OF THE INVENTION

The present invention has been made to solve the above problems. An object of the invention is to provide an image processing system capable of recognizing desired information with high accuracy from images, even though the images are captured in a state where a recognition object or a camera is likely to shake.

An aspect of the present invention provides an image processing system which processes images obtained in series at different time points by capturing a recognition object. The image processing system includes a memory, an image input unit configured to store the images in the memory, a recognition object condition judging portion configured to determine whether or not the recognition object existing in each of the images is recognizable in accordance with a preset determination condition, a recognition object detecting portion configured to detect image areas of the recognition object determined as recognizable by the recognition object condition judging portion, a movement detecting portion configured to detect a movement amount of the recognition object based on the images stored in the memory, a sub-area detecting portion configured to detect sub-areas to be recognized respectively in the image areas of the recognition object read out from the memory, in accordance with the movement amount of the recognition object detected by the movement amount detecting portion, a recognition portion configured to perform recognition processing on the sub-areas detected by the sub-area detecting portion and to store recognized characters and/or recognized patterns and the corresponding reliabilities into the memory as recognition results for the sub-areas, respectively, and a recognition result integration portion configured to read out the recognition results for respective sub-areas from the memory, to integrate the recognition results in the light of the reliabilities, and to output an integrated result.

DETAILED DESCRIPTION OF THE INVENTION

An image processing system according to an embodiment of the invention will be described below with reference to the drawings.

Figure 1:
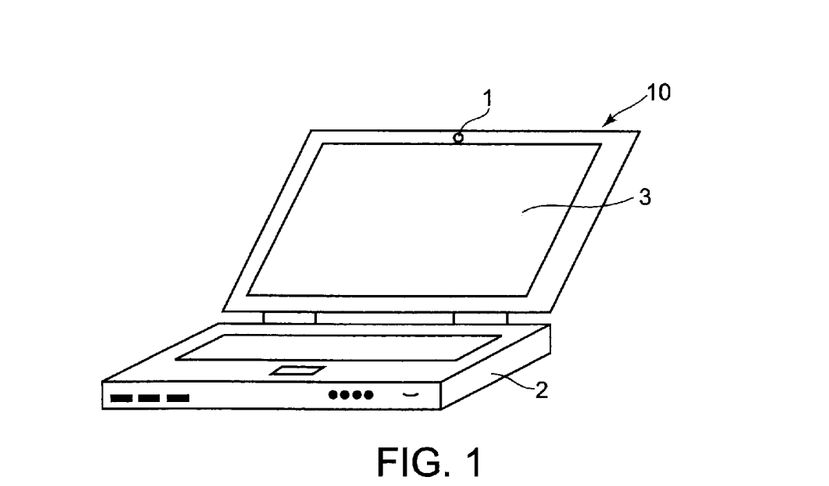
FIG. 1 is a perspective view showing the configuration of an image processing system according to an embodiment of the invention.

As shown in FIG. 1, the image processing system according to the embodiment is a notebook personal computer 10, for example.

Figure 2:
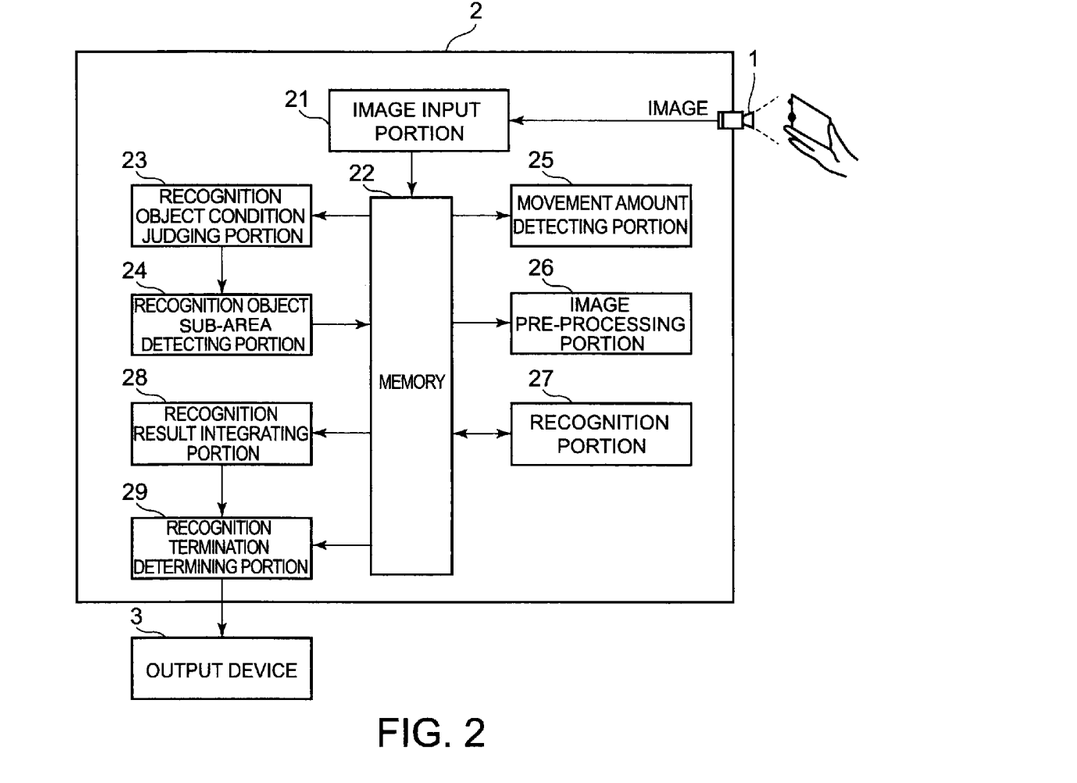
FIG. 2 is a block diagram showing the inner configuration of the image processing system shown in FIG. 1.

The personal computer 10 is provided with a CCD camera 1 as an input device, a computer main body 2 and a liquid crystal display device 3 as an output device. As will be described in detail below, the specific configuration of the computer main body 2 is shown in FIG. 2. An operation of the computer main body 2 is shown in the flowchart shown in FIG. 3.

The image processing system may be a mobile phone equipped with a camera or a disk-top computer to which a Universal Serial Bus (USB) connection type WEB camera is externally connected through a USB cord.

The camera 1 captures an image of a recognition object such as a business card, a postcard, a photograph, or a rectangular document. The recognition object is held to be positioned in a view field of a lens which is an image capturing range, while the both edges of the recognition object are gripped by hands. The camera 1 is image capturing means to input an obtained digital image into the computer main body 2.

In the embodiment, the camera 1 is shown as an example of the input device. However, the input device may be a server on a network, a network line, or a tool such as a communication interface, as long as the input device can input "an image captured by a camera" to the computer main body 2. Besides, various devices may be used as the input device 1.

The output device 3 displays a result of image recognition processing made by the computer main body 2, on a screen. In addition, the output device may be a device other than the liquid crystal display device as long as the device can output the image captured by the camera 1 and a recognition result.

In the following description, a business card is used as an example of an object to be recognized, and a display example is shown, which displays an image of the business card captured by the camera 1 and the recognition result on the screen of the output device 3.

Figure 4:
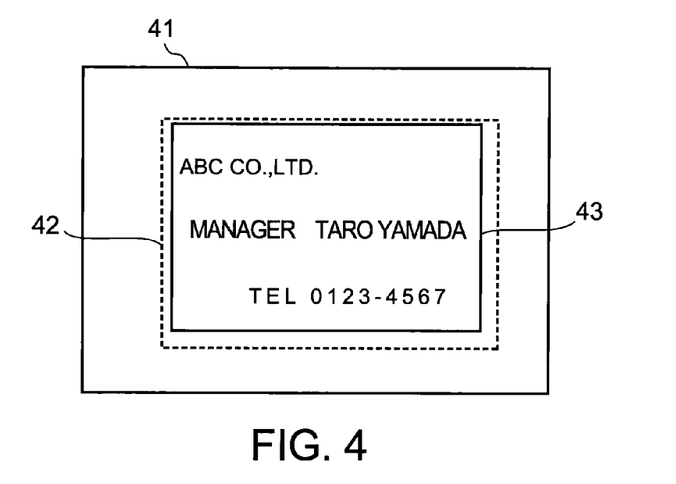
FIG. 4 is a view showing an example of displaying a business card image on a preview screen.

The output device 3 can display a preview screen 41 as shown in FIG. 4. A business card image 43 captured by the camera 1 is continuously displayed on the preview screen 41. A guideline 42, which is a business card frame 42 for positioning an edge portion of the business card, is displayed on the preview screen 41 to allow a user to properly position the business card.

The user is required to move the business card held by hands in the view field of the lens of the camera 1 so that the captured and previewed business card image 43 fits to the business card frame 42 displayed on the preview screen 41. If the business card image 43 fits to the business card frame 42, the business card may be fixed and the camera 1 may be moved.

Figure 5:
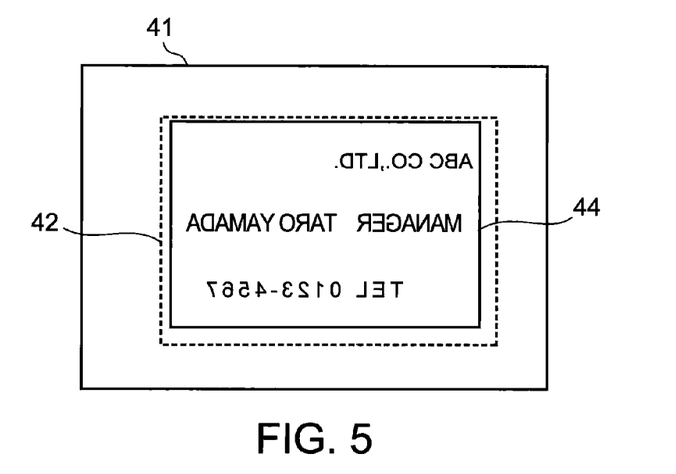
FIG. 5 is a view showing an example of displaying a mirror image of the business card on a preview screen.

In order for the user to easily and intuitively position the position of the business card image 43 inside the preview screen 41, the business card image 43 to be seen on the preview screen 41 (hereinafter, referred to as "a preview image") may be moved to the right, for example, when the business card held by hands is moved to the right. Accordingly, instead of directly displaying the image inputted from the camera 1 to the computer main body 2 on the screen, an image 44 obtained by seeing the business card from and through the back side of the business card (hereinafter referred to as "a mirror image 44") may be displayed as shown in FIG. 5.

Returning now to FIG. 2, the computer main body 2 includes an image input portion 21, a memory 22, a recognition object condition judging portion 23, a recognition object sub-area detecting portion 24, a movement amount detecting portion 25, an image processor 26, a recognition portion 27, a recognition result integration portion 28 and a recognition termination judging portion 29. These elements other than the memory 22 are implemented by a program installed in a hard disk device. The elements may be implemented by hardware, not by software.

The image input portion 21 sequentially stores images inputted from the camera 1 in different buffer areas respectively in the memory 22. The images stored in the memory 22 are respectively given image capturing time points or reception time points. In addition, the image input portion 21 sequentially reads out the images to be processed from the memory 22 and converts the current format of the images into an appropriate format for the computer main body 2 to recognize image patterns.

When a file type of the images does not suit to a predetermined format or when the images are entirely distorted, the computer main body 2 is difficult to recognize the images as it is. Therefore, in this case, the image input portion 21 corrects the images by using a well-known image processing technique such as a technique to convert to a proper file type or a distortion correction technique which uses a correction parameter obtained from the difference between an image captured by an actual lens and an image desirably captured by an ideal camera lens.

When the images captured by the camera 1 (hereinafter, referred to as "a captured images") are inputted to the computer main body 2, the captured images are received by the image input portion 21 and buffered in the memory 22. In the memory 22, operation conditions are set and stored in advance. The operation conditions are a recognition terminating condition, a processing condition and a determination condition, for example.

The recognition object condition judging portion 23 reads out data of the captured images stored in the memory 22 and determines if the business card in the captured image is recognizable according to the determination condition stored in the memory 22.

When the recognition object is a business card as in the example described above, the determination condition is whether the edge of the business card image 43 can be detected in a vicinity of the guide frame 42 shown in FIG. 4 and/or whether the business card is in focus sufficiently. When the edge of the business card image 43 exists in the vicinity of the guide frame 42 or when the business card is in focus, it is determined that the business card is recognizable. On the other hand, when the size of the captured business card is wider than the image capturing range, or when the edge of the business card image 43 does not exist in the vicinity of the guide frame 42, it is determined that the business card is unrecognizable.

When it is determined that the business card existing in the captured image is unrecognizable, the recognition object condition judging portion 23 performs a next processing in accordance with the processing condition stored in the memory 22.

The processing condition may be set such that a next captured image is judged when the business card is unrecognizable. In this case, the next captured image is read out from the memory 22 to judge the condition of the captured image.

Furthermore, the processing condition may be set such that the image is subjected to image quality improving processing and is then subjected to judgment again, when the business card is unrecognizable. In this case, the image processing portion 26 is caused to perform the image quality improving processing to the image to improve the image quality. Subsequently, the whole or part of the captured business card image, which is subjected to the image quality improving processing, is read out from the memory 22 to determine again whether the business card is recognizable.

When it is determined that the business card is unrecognizable, the recognition object condition judging portion 23 outputs information to prompt a user to move the business card, to the output device 3, so that the business card becomes recognizable in the image capturing range of the camera 1. The information may be a voice message or a display message of characters or a figure to instruct a movement direction.

In order to determine whether the edge of the business card image 43 exists in the vicinity of the guide frame 42, detection of a straight line may be performed on the captured image by using a technique such as Hough transformation. In this case, it is checked whether the straight line on the edge of the business card exists in the vicinity of the business card guide frame. Alternatively, it may be judged whether the business card image 43 is held so as to overlap the guide frame 42.

In determining whether the business card is in focus, the business card image existing in the captured image is divided into several small segments. Further, frequency component conversion is performed on each of the segments. It is checked for each of the segments whether a certain value or more of a high frequency component is included or not.

The recognition object sub-area detecting portion 24 detects and cuts out respective areas of business card images, the contents of which are determined as recognizable by the recognition object condition judging portion 23, and stores the cut-out areas in the memory 22 in the order of being captured.

The recognition object sub-area detecting portion 24 detects at least one sub-area from each of the business card images read out one by one from the memory 22, in accordance with a movement amount of the business card. The movement amount is detected by the movement amount detecting portion 25, as will be described below. The sub-area contains a character string existing in each of the business card images, which is to be recognized.

In order to implement the above-described functions the recognition object sub-area detecting portion 24 includes a recognition object detecting portion and a sub-area detecting portion, as will be described below using FIG. 3. The recognition object detecting portion detects and cuts out an area of the business card image. The sub-area detecting portion detects at least one sub-area to be recognized in each business card image by using a layout analysis.

In the embodiment, the user moves the position of the business card by holding the business card by hands so that the business card image 43 is seen within the guide frame 42. In stead, when the camera 1 has a dive mechanism for panning, tilting or zooming, the drive mechanism may dive the camera 1 to adjust the position of the camera 1 automatically so that the business card image 43 overlaps the guide frame 42 by using the business card image information detected by the recognition object condition judging portion 23.

The movement amount detecting portion 25 detects the amount of movement of the business card by use of the business card images stored in the memory 22 in the order of being captured, and detects how the recognition object is moved between the images.

As preprocessing of character recognition of the business card image of the recognition object, the image processor 26 performs image quality improving processing on sub-areas to be recognized, such as super-resolution processing described below. The processing is performed to improve the accuracy of character recognition. In other words, the image processor 26 performs processing on an unrecognizable image to improve the image quality. A captured image, which is determined as "unrecognizable" by the recognition object condition judging portion 23, may be directly subjected to image quality improving processing, when the computer main body 2 has enough power for an engine to be utilized as the image processor 26 to perform image processing. The engine may be hardware such as a graphic chip.

The super-resolution processing is to assume and generate a high-resolution and high-definition image from one or multiple low-resolution images. The super-resolution processing can reduce image deterioration caused by low resolution of image capturing elements or optical blur of a lens. The super-resolution processing can be achieved by using a well-known technique disclosed in "Reconstruction-based Super-resolution Using Self-congruency of Images", Technical Report of The Institute of Electronics, Information and Communication Engineers Japan, IE2007-135, 2007-12, pp. 135-140, for example.

The super-resolution processing requires relatively high calculation cost to perform. Therefore, the super-resolution processing may be performed only on a sub-area of an image area of a recognition object, which fulfils a specific condition that a recognition result of the sub-area can not be obtained within a predetermined period of time, in other word, that a recognition result of the sub-area can be hardly fixed or the size of a character of the sub-area is too small.

The recognition portion 27 performs character recognition on a unit character area within the character string area extracted by the recognition object sub-area detecting portion 24. The recognition portion 27 performs recognition processing on individual character string areas detected by the recognition object sub-area detecting portion 24. The recognized characters and/or patterns and their reliabilities are stored in the memory 22 as recognition results for each character string sub-area. The patterns are symbols, figures or codes, for example.

The recognition result integration portion 28 obtains a character recognition result, which is most reliable or most probable at that time, based on recognized characters and their reliabilities of time series information as recognition results of a character existing in each sub-area of the recognition object image.

By the recognition result integration portion 28, characters and their reliabilities are fixed for each sub-area as a result of integration so that a character string of each sub-area is determined. The series of the processing is referred to as integration of the recognition results. The integrated recognition result, which includes fixed characters and their reliabilities, is stored in the memory 22 as information on each sub-area of the recognition object image.

In other words, the recognition result integration portion 28 reads out character recognition results of the same sub-area obtained by capturing at different time points, from the memory 22. Further, the recognition result integration portion 28 integrates the character recognition results in accordance with the respective reliabilities so as to obtain an integrated result. The integrated result is stored in the memory 22 as a recognition result and is outputted to the output device 3.

The recognition termination judging portion 29 terminates the recognition processing when the recognition portion 27 performs the recognition processing on each sub-area and a preset and stored recognition termination condition is fulfilled.

The recognition termination condition may be whether one of the following events is generated. Specifically, one of the events is that recognition results, which have reliabilities higher than a preset reliability respectively, are obtained in all the sub-areas of the recognition object image stored in the memory 22. Another one of the events is that a recognition processing is repeatedly performed a specific number or more of times but that the recognition state does not exceed a certain level and does not show improvement. Further another one of the events is that a user stops hold a business card, in other word, that a business card image does not exist in an image obtained from the camera 1. Yet another one of the events is that a user performs a recognition termination operation so that a recognition termination command is issued.

Whether a user holds a business card can be determined by using information whether a straight line of an edge of the business card exists in the vicinity of a business card frame. The information can be obtained from the recognition object condition judging portion 23.

Hereinafter, the operation of the personal computer 10 is described by referring to FIGS. 3 to 14. FIG. 3 is a flowchart showing the operation of the image processing system shown in FIG. 2.

Images, which are captured at about 1/15 second intervals, for example, by the camera 1 of FIG. 2, are sequentially inputted to the computer main body 2. With the mage inputs, in the computer main body 2, the image input portion 21 receives the inputted images and stores the images in the memory 22 in the order of being inputted. The images are contiguously inputted to the image input portion 21 at certain intervals. The input of the images and processing of the inputted image data are performed in parallel until the recognition termination condition is fulfilled. The 1/15 second of the time intervals is just an example, and the intervals may be 1/30 second or a different value.

On the other hand, as shown in FIG. 4, a business card image 43 containing a business card which is received by the image input portion 21 is displayed in a preview screen 41 on the output device 3. The business card image 43 is temporarily stored in the memory 22. The stored business card image 43 is outputted to the output device 3 and thus displayed on the screen of the output device 3.

The guide frame 42 is displayed on the preview screen 41 as a guideline to show the size of the outline edge of the business card. The guide frame 42 allows a user to position a captured business card image on the screen 41 properly. The user is required to hold the business card in a view field of the camera 1 so that the business card image 43 can fit to the displayed guide frame 42.

Instead of directly displaying an image which is captured by the camera 1, a mirror image 44 may be displayed on the preview screen 41 as shown in FIG. 5. By displaying the mirror image 44, when the business card held by hands is moved to the right, for example, the business card image 43 which is displayed on the preview screen 41 is also moved to the right. This allows a user to position the captured business card image 43 to be displayed on the preview screen 41 intuitively and easily.

Figure 3:
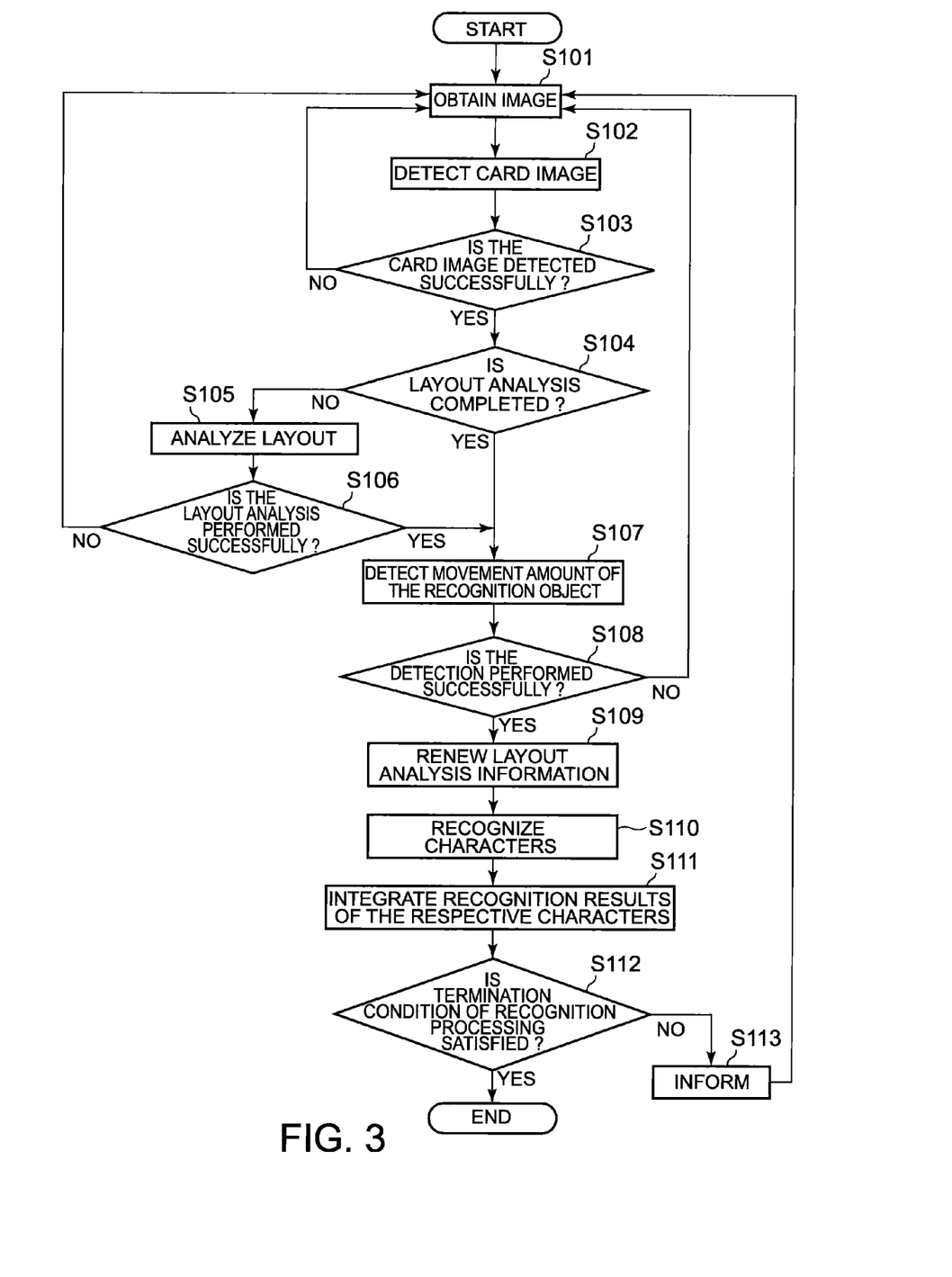
FIG. 3 is a flowchart showing an operation of the image processing system shown in FIG. 2.

Referring to the flowchart of FIG. 3, the image input portion 21 of FIG. 2 acquires image data in accordance with the above described manner (Step S101).

The recognition object condition judging portion 23 reads out the image data from the memory 22 to detect a business card image out of the captured images. The business card image is detected by detecting a straight line by using a technique such as Hough transformation being performed on the input image. By the technique, it is checked whether a straight line of an outline edge of the business card exists in the vicinity of the business card frame (Step S102).

When the detection of the business card image is determined as failed as in the case where four straight lines of the edge of the business card, i.e., top, left, bottom, and right sides are not detected as a result of checking the existence of the straight line, the processing returns to Step S101 to perform the processing again from the image acquisition (the flow of "NO" in Step S103).

In the embodiment, the user is required to move the position of the business card so that the business card is seen in the business card frame. However, as long as the camera has a function of panning, tilting or zooming, the camera can perform automatic adjustment so that the business card image overlaps the business card guide frame by using the business card image information determined by the recognition object condition judging portion 23.

When the business card image is successfully detected, the recognition object sub-area detecting portion 24 detects a sub-area of the recognition object existing in the detected business card image, which is the character string area of the recognition object (the flow of "YES" in Step S103). In the embodiment, the recognition object is printed contents of the business card, and the sub-area is an area of a character string printed on the business card.

The character string area is detected in such a manner that the recognition object sub-area detecting portion 24 performs a layout analysis on the detected sub-area (steps S104 to S106). The character string area is analyzed in further detail to detect a unit character area. When a character is recognized, the detected unit character area is cut out and is matched with the dictionary which is registered in advance so that the character string of a text is outputted. Feature amounts of characters, which are extracted from a large number of character patterns, are registered in the dictionary in association with the character codes.

The layout analysis is to extract components of a document image and is to obtain unit character areas included in the document, a character string area obtained by integrating the unit character areas, a figure area, and attributes of the unit character areas, the character string area, and the figure area.

When the character string area is detected, information on a position, a width, and height of a row is extracted as an attribute. In the case of the unit character area, a position, width, and height of the character string area which includes a character and a position, width, height of the character are extracted as attributes. The information on the layout analysis result, i.e., the information on the position, width, and height, which indicates that in which position of the business card image the character string area exists, is stored in the memory 22 in association with the business card image. The layout analysis performed on the document image is a well-known technique in the field of character recognition. With the layout analysis, the character recognition can be performed easily on an image such as a business card image whose layout has a relatively simple character string area.

In the embodiment, pixels constituting a character within the business card image i.e., dense pixels (hereinafter referred to as "dark pixels"), and background pixels i.e., light pixels, are separated from each other by performing adaptive binarization on the business card image. Labeling processing is performed on the dark pixels. A circumscribed rectangle area with a size recognizable as a character is extracted from the circumscribed rectangle of the labeled dark pixels as a unit character area so that a unit character is extracted. Furthermore, the character string area is extracted by connecting the unit character areas close to each other.

The circumscribed rectangle area, i.e., the unit character area, may be obtained from the arrangement of the pixels in accordance with the above described manner. The circumscribed rectangle area may be registered in the memory 22 in advance as size information of a reference character. Further, each character string area 45 may be detected first by performing the layout analysis on the business card image 43, and subsequently individual unit character areas included in each character string area may be detected.

Figure 6:
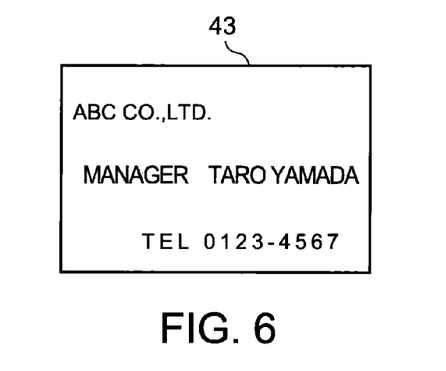
FIG. 6 is a view showing a business card image.
Figure 7:
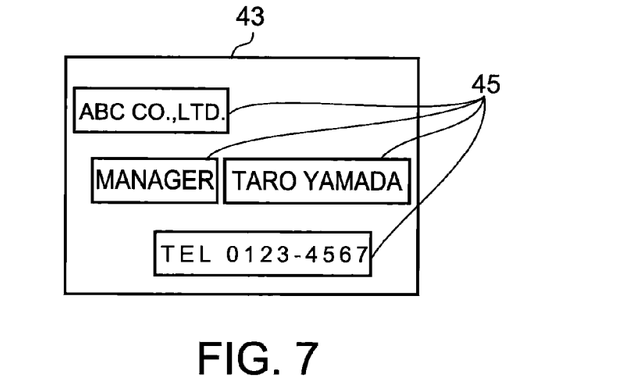
FIG. 7 is a view showing how to extract character string areas from the business card image shown in FIG. 6.
Figure 8:
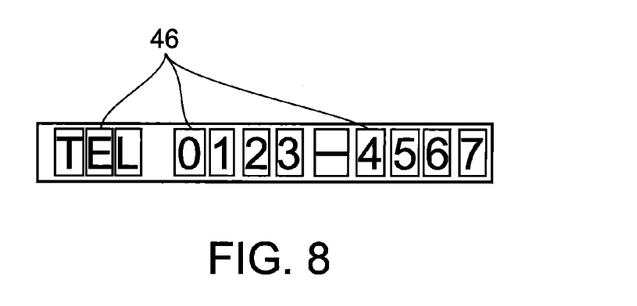
FIG. 8 is a view showing how to detect unit character areas from one of the character string areas shown in FIG. 7.

Specifically, the recognition object sub-area detecting portion 24 of FIG. 2 performs the layout analysis on the business card image 43 as shown in FIG. 6, and extracts or cuts out character string areas 45 as shown in FIG. 7. Then, as shown in FIG. 8, the individual unit character areas 46 included in each of the character string areas 45 are detected from the extracted character string areas 45.

When any character string can not be extracted as a result of the layout analysis, or when it is determined that the layout analysis ends in failure, i.e., when the layout analysis is unsuccessful, the recognition object sub-area detecting portion 24 returns to the Step S101 to read out the next image from the memory 22 and tries the image processing again (the flow of "NO" in Step S106).

The layout analysis may be performed on an image for every frame. As long as the recognition object is not changed, i.e., when a single business card is being continuously recognized, it is efficient that the layout analysis is performed for one frame only once when the business card image is properly fitted into the business card frame for the first time, or that the layout analysis is performed for every several frames, and in other frames, the layout information is renewed by using movement information which is extracted later. In the latter case, the layout information is automatically renewed by using the movement information.

When the layout analysis is successful according to the flow of "YES" in Step S106, the movement amount detecting portion 25 detects the amount of movement of the recognition object which is the business card image, and thus detects the movement of the recognition object between frame images (Step S107).

Figure 9:
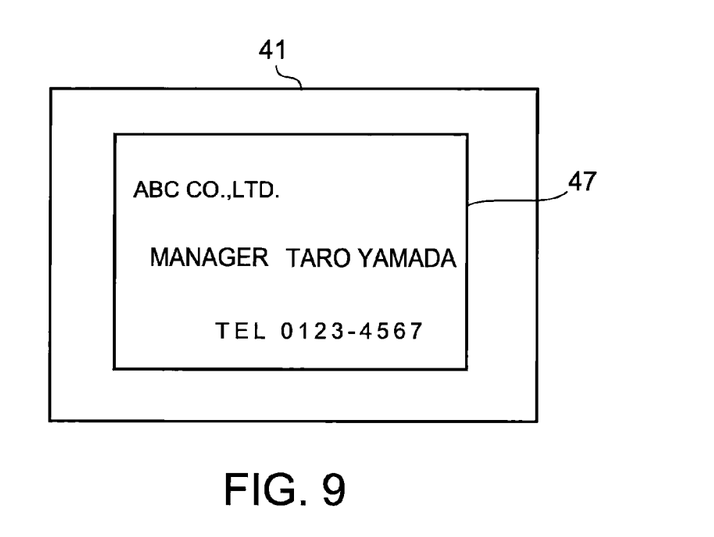
FIG. 9 is a view showing an image captured at time k−1.
Figure 10:
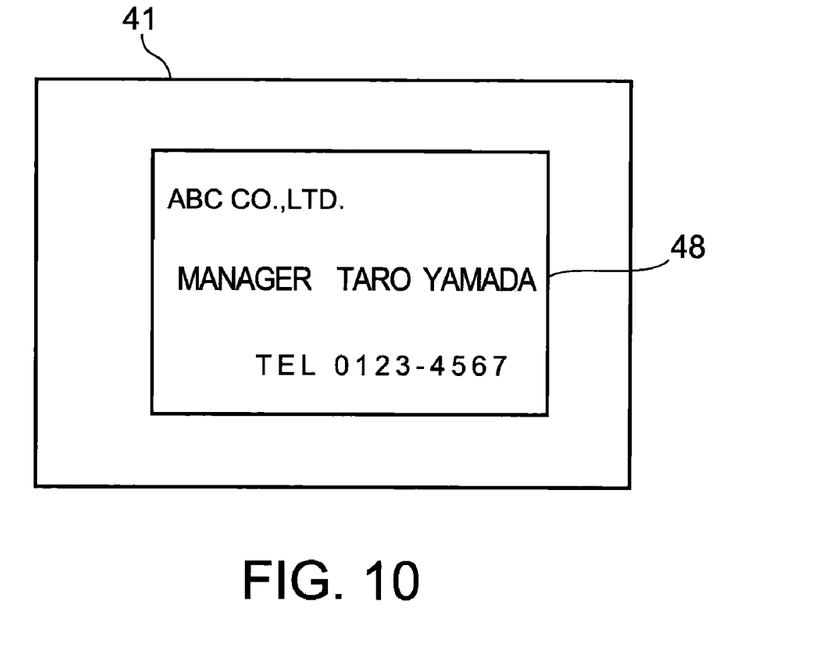
FIG. 10 is a view showing an image captured at time k.
Figure 11:
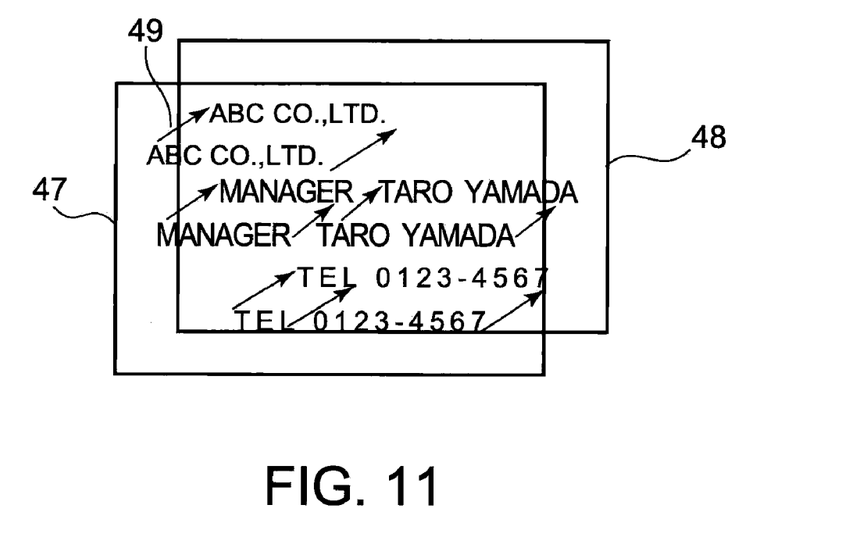
FIG. 11 is a view showing an example of optical flow detection.

Specifically, as shown in FIG. 9, some feature points in a certain position are detected from an image 47 captured or acquired at time k−1 and stored in the memory 22. At the next time point k, as shown in FIG. 10, the same feature points are detected from the captured or acquired images 48 and stored in the memory 22. Furthermore, as shown in FIG. 11, motion components 49, i.e., a direction and a distance, of the recognition object are obtained by detecting how the feature points move between the two images 47, 48 which are acquired along the time series, i.e., by detecting an optical flow between the frame images.

When the positions of the feature points between the frame images cannot be determined and thus the detection of the amount of movement ends up in failure because of the blurred input image or the like, the processing returns to Step S101 to try the processing from image acquisition again (the flow of "NO" in Step S108).

By obtaining the optical flow in accordance with the above described manner, the character positions between the frame images can be associated with each other by renewing the layout information according to the optical flow even when the position of the business card held up by a user is somewhat moved (Step S109).

When the amount of movement is successfully detected, according to the flow of "YES" in Step S108, the movement amount detecting portion 25 renews the layout analysis information of the memory 22 according to the detected movement (Step S109).

Furthermore, the recognition portion 27 performs character recognition on the characters within the character string area extracted by the recognition object sub-area detecting portion 24 (Step S110). Before performing the character recognition, the recognition portion 27 performs determination of an image condition of whether or not a sub-area of the recognition object read out from the memory 22 can be recognized. When the determination result shows that the image condition of the sub-area is poor, i.e., in the case where the image contains many noise components or where the image is blurred, the character recognition is not performed.

In this case, the recognition portion 27 prompts the image processor 26 to perform the image quality improving processing on the sub-area. The image data subjected to the image quality improving processing is stored in the memory 22. After that, the recognition portion 27 reads out, from the memory 22, the image data of the sub-area subjected to the image quality improving processing to perform character recognition again. The image quality improving processing is not always necessary and may be optionally carried out.

The recognition portion 27 performs matching between the dictionary data for character recognition and the cut-out character image or the feature information extracted from the image. Then, the recognition portion 27 performs character recognition processing by reading out the most reliable character from the dictionary. Also, the recognition portion 27 stores a character code and the reliability of the character code for the cut-out character image into the memory 22 as a recognition result of an individual character. This processing is performed for the number of the character strings so that the memory 22 stores the data pieces of the recognition results for the characters in each character string area. This processing is performed for each image which is sequentially acquired by the image input portion 21 so that the recognition results of the same character can be obtained in time series.

The recognition result integration portion 28 obtains time series data pieces of the recognition results for each character in each character string area, and integrates the obtained character recognition results (Step S111).

Specifically, the recognition result integration portion 28 determines a character recognition result and the reliability of the character recognition result, from the plural data pieces of the character recognition results for the sub-area obtained as time series information. The determined character recognition result is a data piece which is most frequently recognized at the time and thus is the most reliable, i.e., the most probable recognition result.

In order to integrate the recognition results, the recognition integration portion 28 chooses character recognition results each of which has a reliability higher than a predetermined threshold TH_r among the character recognition results for k frames (k>0) to make a majority vote. Then, among the chosen character recognition results for the k frames, the recognition integration portion 28 determines a most probable character and calculates the percentage of the most probable character to obtain reliability of the most probable character.

Figure 12:
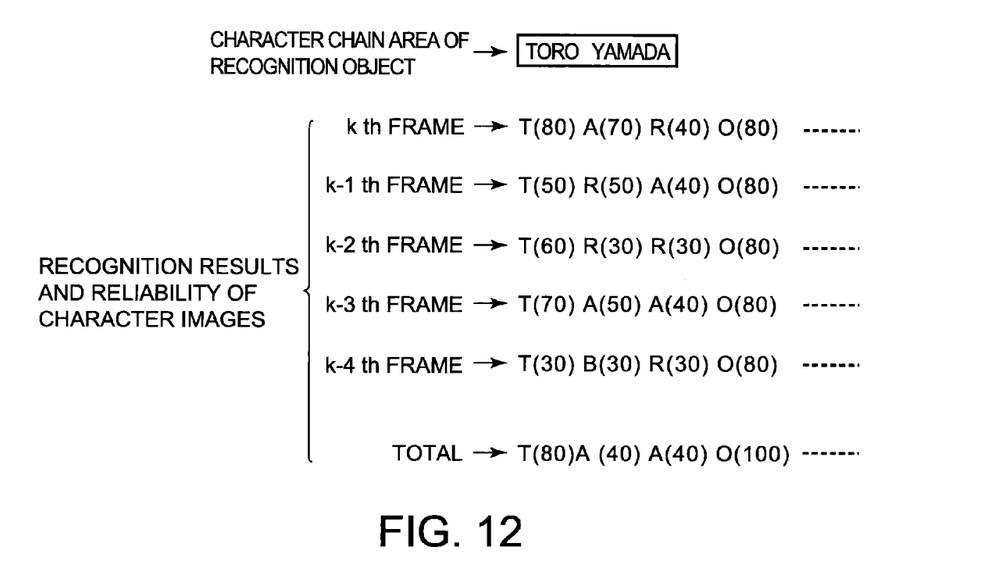
FIG. 12 is a view showing an example of illustrating how recognized results are integrated.

An example of the above processing is shown in FIG. 12. The character string area of the recognition object is "TARO YAMADA". The reliability is a value between 0 and 100. A larger value means higher reliability. The number of frames k is 5 and the threshold TH_r is 30. The recognition result integration portion 28 selects the most probable recognition result among the characters and the reliabilities which are the recognition results recognized five times with respect to a series of time points k−4 to k.

In the example of FIG. 12, four frames determine the first character "T" as "T", so that a character which has higher reliability than the threshold TH_r 30 is "T". Thus, "T" is determined as the most probable character recognition result. The reliability of the most probable character recognition result is 80 (⅘*100). Further, two frames determine the character "A" adjacent to "T" as "A", and one frame determines the character "A" as "R", so that a character which has higher reliability than the threshold TH_r 30 is "A". Thus, "A" is determined as the most probable character recognition result. The reliability of the most probable character recognition result is 40 (⅖*100).

In addition, one frame determines the character "R" as "R", and two frames determine the character "R" as "A", so that a character which has higher reliability than the threshold TH_r 30 is "A". Thus, "A" is determined as the most probable character recognition result. The reliability of the most probable character recognition result is 40 (2/5*100). Further, five frames determine the character "O" as "O", so that a character which has higher reliability than the threshold TH_r 30 is "O". Thus, "O" is determined as the most probable character recognition result. The reliability of the most probable character recognition result is 100 (5/5*100).

In other words, the integration result of "TARO" in the character string area at this time point becomes character strings of "T", "A", "A", and "O" whose reliabilities are respectively 80, 40, 40, and 100. In the case, in addition, the integration result can be made "TARO" by adjusting the position of the business card.

When the integration processing of the character recognition results in one sub-area, i.e., one character string area, is finished in Step S111, a flag of "done" is added to the sub-area in the memory 22 of FIG. 2. By checking the flag and the data pieces of the character recognition results, it can be determined whether or not the sub-area is already recognized.

Subsequently, referring to the recognition terminal condition set in advance in the memory 22, the recognition termination judging portion 29 shown in FIG. 2 determines whether or not the recognition processing is to be finished (Step S112). Specifically, for example, when all the character recognition processes and the integration processing of the character recognition results are finished, the computer main body 2 finishes the image processing (the flow of "YES" in Step S112). Alternatively, the image processing is finished when the reliabilities calculated as the integration results exceed a predetermined threshold respectively for all of the characters of the recognition object, for example.

Figure 13:
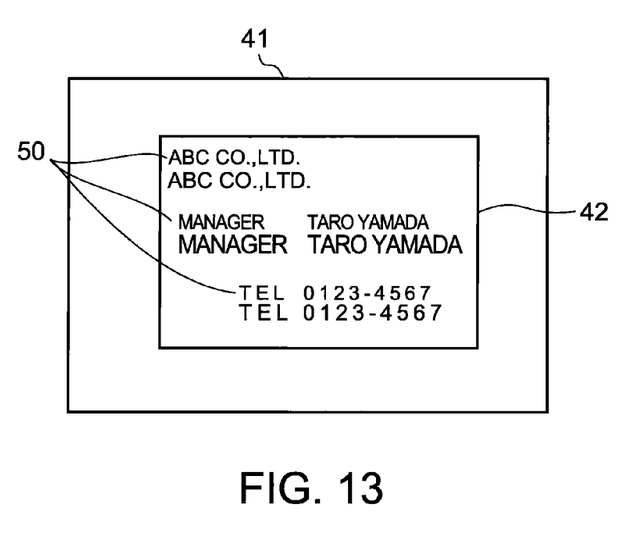
FIG. 13 is a view showing an example of displaying recognized characters on a preview screen.

The output device 3 of FIG. 2 displays the character recognition result or the reliability of the character recognition on the screen so as to allow user to check the character recognition result displayed on the preview screen 41. One example of the display is shown in FIG. 13. In FIG. 13, recognized characters 50 of text are displayed along each character string area, in the business card frame which is displayed on the preview screen 41 and which is a guide frame for the business card. Besides, the recognized characters may be emphasized in a way that the characters 50 of text are displayed in a different color or that the characters 50 of text are surrounded by a frame.

Furthermore, due to characteristics of a lens, an image captured by a camera 1 may have an image quality deteriorated partially even though the center portion has a good image quality. Specifically, a peripheral portion of the captured image may be blurred, deformed, or darkened in brightness. Since such camera 1 captures an image with a poor image quality in the periphery portion of the image and thus the character recognition is less likely to be converged.

When it is determined that the business card is unrecognizable, the recognition object condition judging portion 23 outputs information to prompt a user to move the position of the business card, to the output device 3, so that the business card is recognizable within the image capturing range of the camera 1. When the output device 3 causes the preview screen 41 to display a message to prompt the user to move the position of the business card, for example, the user is provided with movement instruction (Step S113). When the user moves the position of an unrecognized sub-area in response to this movement instruction, the character recognition can be improved.

Figure 14:
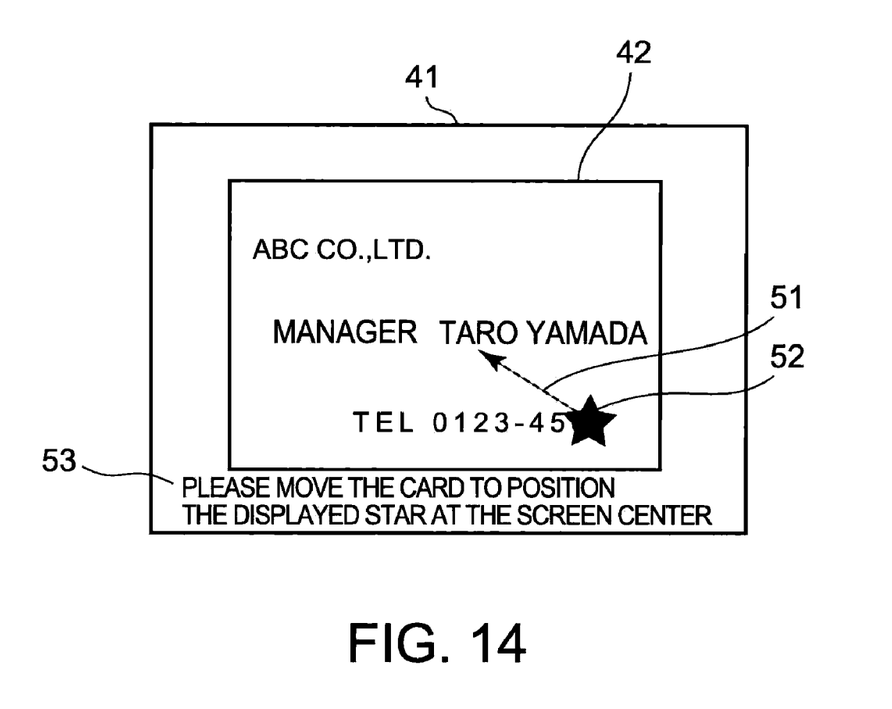
FIG. 14 is a view showing a display example of the screen on which an instruction to move a position of the business card is displayed.

FIG. 14 shows a display example for prompting the user to move the position of the business card. In addition to displaying an arrow in the moving direction of the business card, i.e., a dotted lined arrow 51, and/or a mark, i.e., a star mark 52, a message 53 that "move the business card so that the star comes in the center of the screen", for example, can be shown. A voice message may be outputted to prompt the user to move the business card frame 42, which is the guide frame of the business card.

The image processing system according to the embodiment is able to recognize an image, a character image, for example in an environment, in which an image with a stable image quality is difficult to capture. Every time an image is obtained, the image processing system detects a recognizable sub-area to perform recognition processing on the recognizable sub-area. The image processing system stores recognition results of time-series images which are acquired in the capturing order for each sub-area. Then, the image processing system integrates the stored recognition results for each sub-area. In this manner, the image processing system is able to obtain more stable and highly-accurate recognition results.

In the embodiment as described above, the components other than the memory 22 of FIG. 2 are implemented by a program installed in storage such as a hard disk device in the computer main body 2. Instead, the components other than the memory 22 of FIG. 2 may be implemented in such a manner that the program is stored in a recording medium such as a computer readable CD-ROM and the computer main body 2 is caused to read out the program from the recording medium. Furthermore, the programs may be implemented in such a manner that the components are stored in a dispersed manner in different computers which are connected to one another through the network, and then the computers in which the components are functioned communicate with one another.

Other embodiments or modifications of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. An image processing system which processes images obtained in series at different time points by capturing a recognition object, comprising:
   a memory;
   an image input unit configured to store the images in the memory;
   a recognition object condition judging portion configured to determine whether or not the recognition object existing in each of the images is recognizable in accordance with a preset determination condition;
   a recognition object detecting portion configured to detect image areas of the recognition object determined as recognizable by the recognition object condition judging portion;
   a movement detecting portion configured to detect a movement amount of the recognition object based on the images stored in the memory;
   a sub-area detecting portion configured to detect sub-areas to be recognized respectively in the image areas of the recognition object read out from the memory, in accordance with the movement amount of the recognition object detected by the movement amount detecting portion;
   a recognition portion configured to perform recognition processing on the sub-areas detected by the sub-area detecting portion and to store recognized characters and/ or recognized patterns and the corresponding reliabilities into the memory as recognition results for the sub-areas, respectively; and a recognition result integration portion configured to read out the recognition results for respective sub-areas from the memory, to integrate the recognition results in the light of the reliabilities, and to output an integrated result.

2. The image processing system according to claim 1, further comprising an image processing portion configured to perform image quality improvement processing to improve quality of one of an unrecognizable image or an area of the image.

3. The image processing system according to claim 2, wherein the recognition object condition judging portion determines again whether or not the recognition object is recognizable by using one of the image of the recognition object or the area of the image quality-improved by the image quality improvement processing.

4. The image processing system according to claim 2, wherein the recognition portion performs recognition processing again by using one of the image of the recognition object or the area of the image quality-improved by the image quality improvement processing.

5. The image processing system according to claim 1, further comprising a camera, wherein when the recognition object condition judging portion determines that an image of the recognition object or an area of the image is unrecognizable, the recognition object condition judging portion outputs information prompting a user to move the recognition object to make the recognition object recognizable within an image capturing range of the camera.

6. The image processing system according to claim 1, further comprising a recognition termination determining portion configured to terminate the recognition processing of the sub-area when a preset recognition terminating condition is fulfilled as a result of the recognition processing completed by the recognition portion.

7. The image processing system according to claim 1, further comprising an output device, wherein the output device outputs the integrated result obtained by the recognition result integration portion and one of an image or an area of the mage of the recognition object.

* * * * *